Patented Aug. 15, 1939

2,169,329

UNITED STATES PATENT OFFICE 2,169,329

STABILIZING ORGANIC ESTERS OF CELLULOSE

George W. Seymour, Cumberland, Md., assignor to Celanese Corporation of America, a corporation of Delaware No Drawing. Application August 14, 1937, Serial No. 159,114

12 Claims. (Cl. 260—230)

This invention relates to chemically stabilized organic esters of cellulose and to the process of preparing same wherein the chemicals used as stabilizers are tertiary amine compounds derived from aryl aniline and the time of treatment is just prior to or concurrent with the precipitation of the cellulose ester from the ripening solution.

An object of the invention is the economic and expeditious production of stable organic esters of cellulose by a process of production that is shorter in time and requires less space and apparatus than when stabilizing precipitated cellulose esters by former methods. Another object of the invention is the production of a cellulose ester which when dyed is resistant to acid fading. Other objects of the invention will appear from the following detailed description.

In the process of preparing organic esters of cellulose, the esterification of the cellulose is usually performed by treating the cellulose with an organic acid anhydride in the presence of an organic acid diluent or solvent for the ester of cellulose being formed and a catalyst such as sulphuric acid. After completion of the esterification of the cellulose, there results a homogeneous viscous solution and water may then be added in amounts sufficient to convert any organic acid anhydride remaining into the corresponding acid, whereupon usually after the addition of a certain quantity of water, the cellulose ester is permitted to hydrolyze or ripen to develop the desired solubility characteristics. Water and/or other non-solvent for the cellulose ester may then be added in sufficient amounts to precipitate the cellulose ester from the solution. The cellulose ester is then washed and/or distilled to free it of acids as much as possible.

Thus in making cellulose acetate by the above method, the so-called solution method, cellulose is acetylated by means of acetic anhydride and a catalyst in the presence of large amounts of acetic acid which dissolves the cellulose acetate that is formed to produce a very heavy viscous solution. To this solution is added water, then it is allowed to stand until it develops the proper solubility characteristics. This solution after hydrolysis or ripening is usually streamed or poured into water which dilutes the acetic acid to such an extent that it is no longer capable of holding the cellulose acetate in solution, with the result that the cellulose acetate precipitates. However, since the solution of cellulose acetate is very viscous, the water acts on the particles or streams thereof to precipitate the outer layers of the same to produce a sort of case-hardening effect, with the result that included catalyst and reagents as well as impurities are only with difficulty removed by washing.

In place of adding the organic ester of cellulose solution to water, the water may be added to the solution with or without the aid of mechanical or inert gaseous agitators. Or other methods of precipitation may be employed and other precipitants than water may be used, although even then a certain amount of reagents and impurities are entrapped in the particles of cellulose ester.

The cellulose ester so formed contains sulphur in the form of various compounds which impair the stability of the cellulose ester and impart thereto the tendency of decomposing and discoloring. There may also be formed cellulose derivatives that tend to decompose and break down in the presence of the sulphur compounds.

By treating cellulose esters according to this invention the cellulose esters are made stable, have a high heat test, that is, they may be heated to a relatively high temperature without decomposing or charring, are clear and free from haze and have enhanced spinning properties. The cellulose esters produced by the method of this invention have a heat test from 10 to 20% higher than cellulose esters produced by non-chemical stabilizing means. The cellulose esters prepared according to this invention have a good spinning stability. Solutions thereof have excellent filtration properties, passing readily through the filtering media, and have the property of being able to be spun into filaments of low denier.

The organic esters of cellulose prepared according to this invention are exceptionally stable in the presence of light and industrial gases. The yarn and fabric made from filaments formed of cellulose esters prepared according to this invention are dyed evenly and to the same extent, by non-water soluble dyes, as the same type of materials prepared by other methods of stabilizing. Cellulose acetate that has been chemically stabilized may show a little more than normal resistance to delustering and saponification. Yarns and fabrics made from organic esters of cellulose prepared in accordance with this invention that have been dyed may be subjected to bright sun light, industrial gases, perspiration, etc. for longer periods of time than non-chemically stabilized organic esters of cellulose without a change in color.

In accordance with this invention, organic esters of cellulose are stabilized by adding thereto suitable chemicals at the time of precipitation and after ripening. Thus while beating in the water necessary to precipitate the cellulose ester, after ripening, there is added a tertiary amine compound having at least two aryl groups such that it could be said to be a tertiary amine compound derived from aryl aniline, which compounds are well dispersed through the gell or solution and when precipitation occurs enough of it is retained in the cellulose ester to promote stability. The contained compounds react or combine with the impurities in the precipitated cellulose ester to form stable compounds. After the precipitation the cellulose ester may be thoroughly washed to remove as much as possible compounds other than the desired organic ester of cellulose. However, a trace of the chemical stabilizing agent will be retained in the cellulose ester. By this method the stabilizing reagent is carried to all parts of the particles of the cellulose ester and its reaction is not limited to the surface of the particles. Other methods of precipitation may be employed. Thus, the chemical stabilizing agent may be mixed with a ripened solution at the time of or just prior to the pouring or extruding same into the precipitating bath.

This invention may be employed in the making of an organic ester of cellulose that is used to form filaments, films, foils, plastics or lacquers. Examples of such organic esters of cellulose are cellulose acetate, cellulose formate, cellulose propionate and cellulose butyrate.

Cellulose in any suitable form, such as cotton, cotton linters, wood pulp prepared by either the sulphite or soda process, reconstituted cellulose, etc., may be employed in making the cellulose esters. This cellulose may be activated by pretreatment with lower aliphatic acids or by treatment with alkali, etc. The esterifying agent may be acetic anhydride, formic acid, propionic anhydride or butyric anhydride, depending upon the ester of cellulose to be formed.

The esterification may be carried out in the presence of a suitable catalyst such as sulphuric acid, sodium bisulphate, methyl sulphate or a mixture of these with each other or with other catalysts, such as zinc chloride. While I prefer to employ acetic acid as the diluent or solvent for the cellulose ester to be formed, any other suitable organic acid may be employed such as propionic acid and butyric acid. The sulphur bearing acids and salts employed as catalyst are rearranged or broken down in the esterifying process and some of the sulphur present combines with the reagents present to form sulpho-acetate of cellulose. The sulpho-acetates of cellulose are difficult to remove and greatly decrease the stability of the final product obtained. Sulpho-cellulose compounds are also formed from sulphur compounds included in the anhydride and diluent used, which anhydride and diluent may have been used in the pretreating or esterification of previous batches of cellulose using sulphuric acid or sulphate salts as catalysts. The sulphur compounds are present in the anhydride or diluent due to the fact that the anhydride or diluent was converted or concentrated in the presence of sulphuric acid or sulphate salts as catalysts, or for the reason that the sulphuric acid or sulphate salts may have been present as impurities in the catalysts employed.

During the hydrolizing or ripening period of the cellulose ester, there may be added to the ripening solution small quantities of inorganic salts as an aid in reducing the formation of unstable compounds. Examples of such salts are aluminum chloride and zinc chloride. In certain cases hydrochloric acid may be employed as an aid in reducing the formation of unstable compounds. The addition of such materials may permit of the reduction of the amount of the catalyst used in the esterification mixture and/or in the ripening solution. The catalyst used in the esterification and ripening solution mixture may be wholly or partially neutralized prior to the addition of the chemical stabilizing reagent. Good results are obtained, however, by employing sufficient of the chemical stabilizing reagent to neutralize the catalyst or in an amount theoretically to combine with the inorganic catalyst. By partially neutralizing the catalyst with an inorganic salt prior to the addition of the chemical stabilizing reagent smaller amounts of the chemical stabilizng reagent may be employed. This reduces the amount of chemical stabilizing reagent necessary to form a stable cellulose ester, thus affecting a saving in the amount of material used and preventing the inclusion of excessive amounts of the salts of the reagent remaining in the precipitated cellulose ester. Thus where a catalyst such as sulphuric acid is employed in the estertifying process it may be substantially or partially neutralized by the addition of an alkali or alkaline salt, for example, a carbonate or bicarbonate, of sodium or potassium or the ammonium salt of the organic acid employed as diluent or solvent and then from $\frac{1}{50}$ to $\frac{1}{2}$ of the theoretical amount of stabilizing reagent to neutralize all the sulphuric acid employed is added.

The following compounds are examples of the chemical stabilizing agents that may be used, Diphenyl aniline
Dibenzyl aniline
Benzyl methyl aniline
Benzyl ethyl aniline
Benzyl phenyl aniline and like tertiary amine compounds having at least two aryl groups. The chemical stabilizing agent is a tertiary base capable of reacting with inorganic acids and incapable of reacting with the acidic or other anhydride employed to form acetyl or acidyl basic compounds. The chemical stabilizing agent, as stated above, is a tertiary amine having two aryl substitutions and one substitution either aryl or alkyl. As stated above, the amount of the chemical stabilizing agent used may be substantially that amount required to theoretically combine with the sulphuric acid present in the cellulose ester calculated as $SO_4$. However, more or less than the theoretical amount may be employed when the inorganic catalyst is substantially or partially neutralized by inorganic salts less than the theoretical amount necessary to combine with the sulphuric acid present may be employed or less than the theoretical amount may be employed without neutralizing the catalyst. For good results from $\frac{1}{50}$ of the theoretical amount up to the theoretical amount may be employed. After the precipitation it is preferable that the cellulose ester be washed to remove any excess of compounds or readily soluble compounds from the same. After addition of the chemical stabilizing reagent the solution of cellulose ester may be heated to 80° C. for a short period of time just prior to precipitation, but this is not necessary for good results are obtained at a below room temperature. Any degree of temperature may be employed from below room temperature to above the boiling point of the organic acid used as the solvent for the cellulose acetate.

For the purpose of describing the invention but not with the intention of being limited thereto, the following examples are given:

*Example I*

A solution of cellulose acetate ready for precipitation is mixed with benzyl ethyl aniline equal to the molecular equivalent of the sulphuric acid present. The cellulose acetate is then precipitated by adding water while agitating same. The cellulose acetate is found to stand a heat test of 240° C., is clear, has good spinning properties and is exceptionally resistant to acid fading when dyed.

*Example II*

A solution of cellulose acetate made with sulphuric acid as the catalyst ready for precipitation is mixed with a concentrated solution of sodium acetate in amount to theoretically neutralize the sulphuric acid present. Then $\frac{1}{8}$ of the theoretical quantity of benzyl ethyl aniline necessary to neutralize the total sulphuric acid present prior to the addition of the sodium acetate is added along with sufficient water to precipitate the cellulose acetate. Cellulose acetate is then washed with hot water and rinsed with cold water. The cellulose acetate is found to stand a heat test of 240° C., has good spinning properties and is resistant to acid fading when dyed.

It is to be understood that the foregoing detailing description is merely given by way of illustration and that many variations may be made therein without departing from the spirit of my invention.

Having described my invention, what I desire to secure by Letters Patent is:

1. Process for stabilizing organic esters of cellulose, which comprises treating organic esters of cellulose which are unstable owing to the presence of catalyst residues, while in solution, with a tertiary amine containing at least two aryl groups.

2. Method of stabilizing organic esters of cellulose, which comprises treating organic esters of cellulose, which are unstable owing to the presence of catalyst residues while in solution with benzyl ethyl aniline.

3. Method of stabilizing cellulose acetate, which comprises treating cellulose acetate, which is unstable owing to the presence of catalyst residues, while in solution with benzyl ethyl aniline.

4. Process for the manufacture of stable organic ester of cellulose, which comprises forming an organic ester of cellulose in the presence of an inorganic acid catalyst, at least partially neutralizing the acid catalyst, adding to the resulting solution a tertiary amine containing at least two aryl groups, and thereafter precipitating the organic ester of cellulose from the solution.

5. Process for the manufacture of a stable organic ester of cellulose, which comprises forming an organic ester of cellulose in the presence of a catalyst containing the $SO_4$ radicle, adding to the solution of the organic ester of cellulose so formed a tertiary amine containing at least two aryl groups, the proportion of said amine being substantially equal to that necessary to neutralize the $SO_4$ radicle present, and thereafter precipitating the organic ester of cellulose from solution.

6. Process for the production of a stable cellulose acetate, which comprises ripening cellulose acetate, adding to the ripening solution benzyl ethyl aniline, and thereafter precipitating the cellulose acetate from the ripening solution in a finely divided form.

7. Process for the manufacture of a stable organic ester of cellulose, which comprises forming an organic ester of cellulose in the presence of an inorganic acid catalyst, ripening the said organic ester of cellulose, at least partially neutralizing the acid catalyst, adding to the ripening solution a tertiary amine containing at least two aryl groups, the proportion of said amine being at least $\frac{1}{50}$ of the theoretical amount of the amine which would be necessary to neutralize the inorganic acid catalyst employed, and thereafter precipitating the organic ester of cellulose from the ripening solution.

8. Process for the manufacture of a stable cellulose acetate, which comprises forming cellulose acetate in the presence of sulphuric acid, ripening the said cellulose acetate, at least partially neutralizing the sulphuric acid, adding to the ripening solution a tertiary amine containing at least two aryl groups, the proportion of said amine being at least $\frac{1}{50}$ of the theoretical amount of the compound which would be necessary to neutralize the sulphuric acid employed, and thereafter precipitating the cellulose acetate from the ripening solution.

9. Process for the manufacture of a stable organic ester of cellulose, which comprises esterifying cellulose in the presence of an inorganic acid catalyst, ripening the resulting organic ester of cellulose, at least partially neutralizing the acid catalyst, adding to the ripening solution a proportion of benzyl ethyl aniline which is at least $\frac{1}{50}$ of the theoretical amount which would be necessary to neutralize the inorganic acid catalyst employed, and thereafter precipitating the organic ester of cellulose from the ripening solution.

10. Process for the manufacture of a stable cellulose acetate, which comprises acetylating cellulose in the presence of sulphuric acid, ripening the resulting cellulose acetate, at least partially neutralizing the sulphuric acid, adding to the ripening solution a proportion of benzyl ethyl aniline which is at least $\frac{1}{50}$ of the theoretical amount which would be necessary to neutralize the sulphuric acid employed, and thereafter precipitating the cellulose acetate from the ripening solution.

11. Process for the production of a stable organic ester of cellulose, which comprises esterifying cellulose in the presence of an inorganic acid catalyst, ripening the resulting organic ester of cellulose, adding to the ripening solution a tertiary amine containing at least two aryl groups, and thereafter precipitating the organic ester of cellulose from the ripening solution.

12. Process for the production of a stable cellulose acetate, which comprises acetylating cellulose in the presence of sulphuric acid, ripening the resulting cellulose acetate, adding to the ripening solution a tertiary amine containing at least two aryl groups, and thereafter precipitating the cellulose acetate from the ripening solution in a finely divided form.

GEORGE W. SEYMOUR.